2,636,612

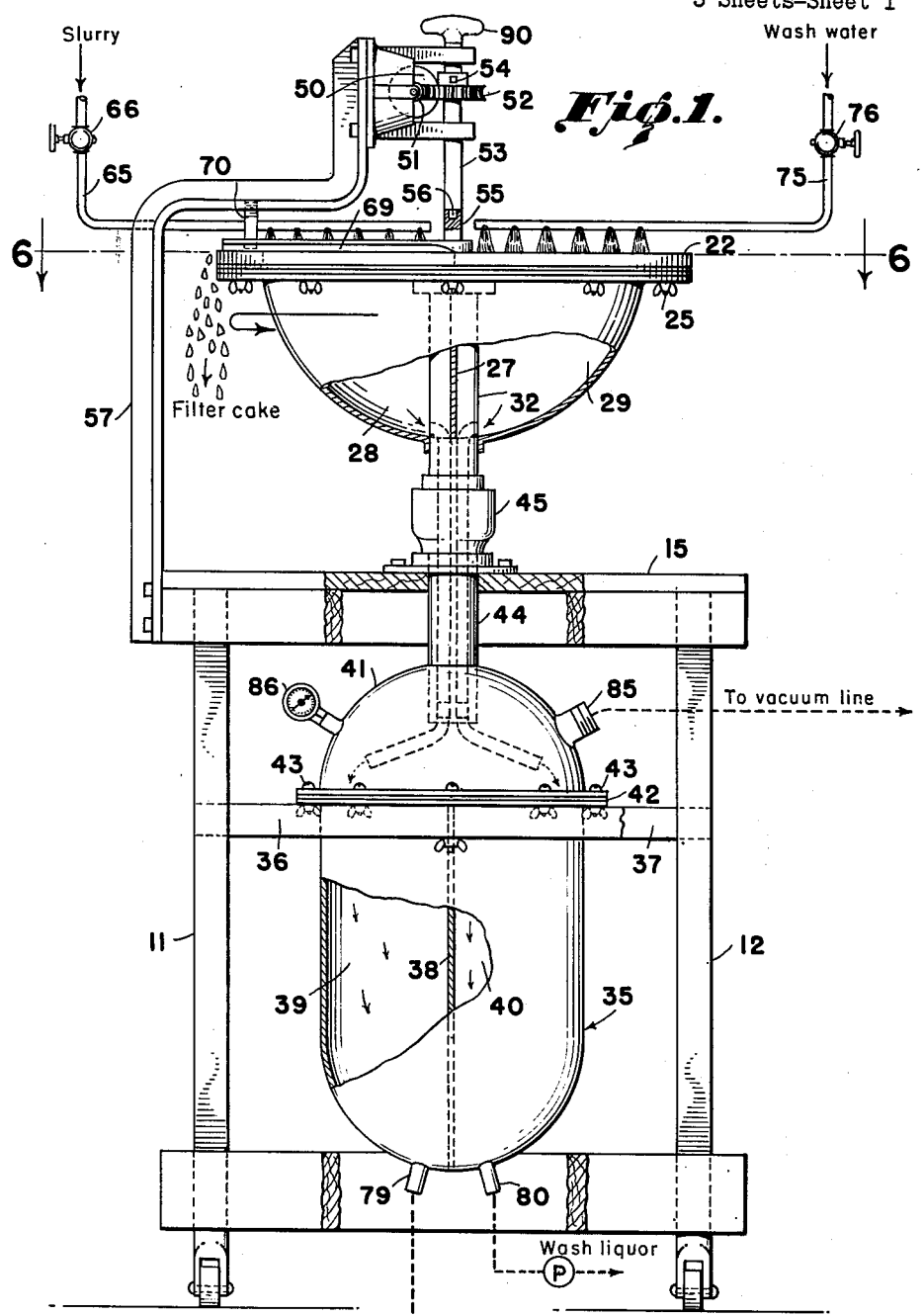

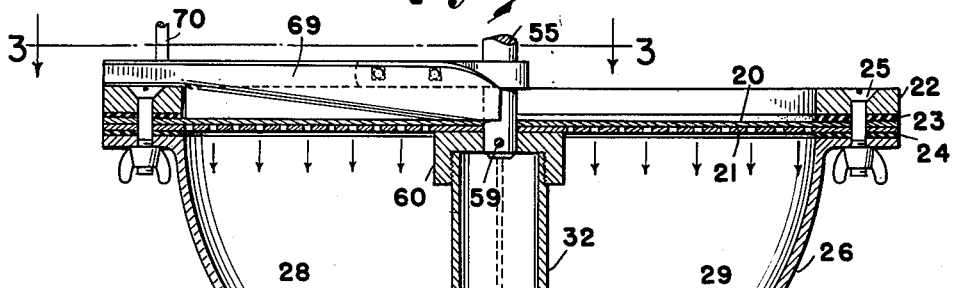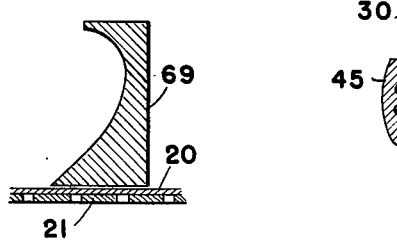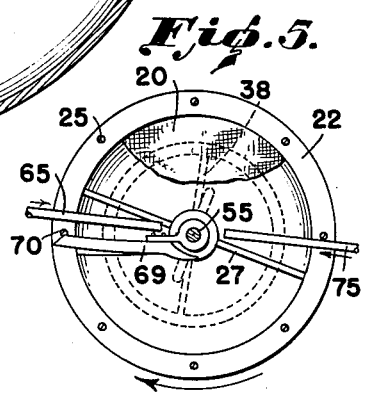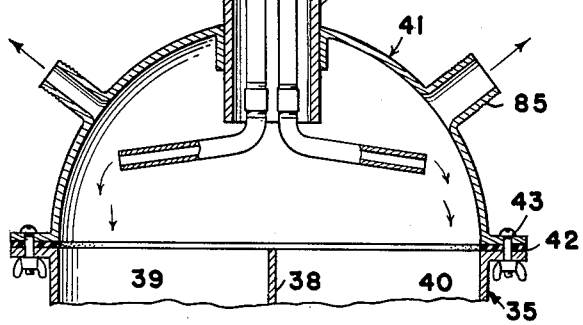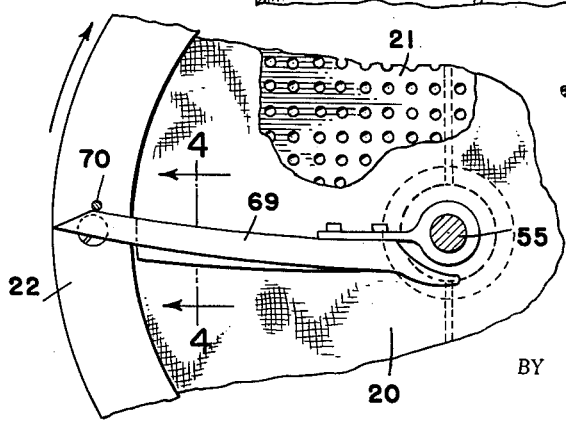
INVENTORS
J. CORDING JR.
A. SHAINES
ATTORNEY April 28, 1953　　　J. CORDING, JR., ET AL　　　2,636,612
FILTER
Filed June 4, 1952　　　　　　　　　　　　　3 Sheets-Sheet 3
Fig. 6.
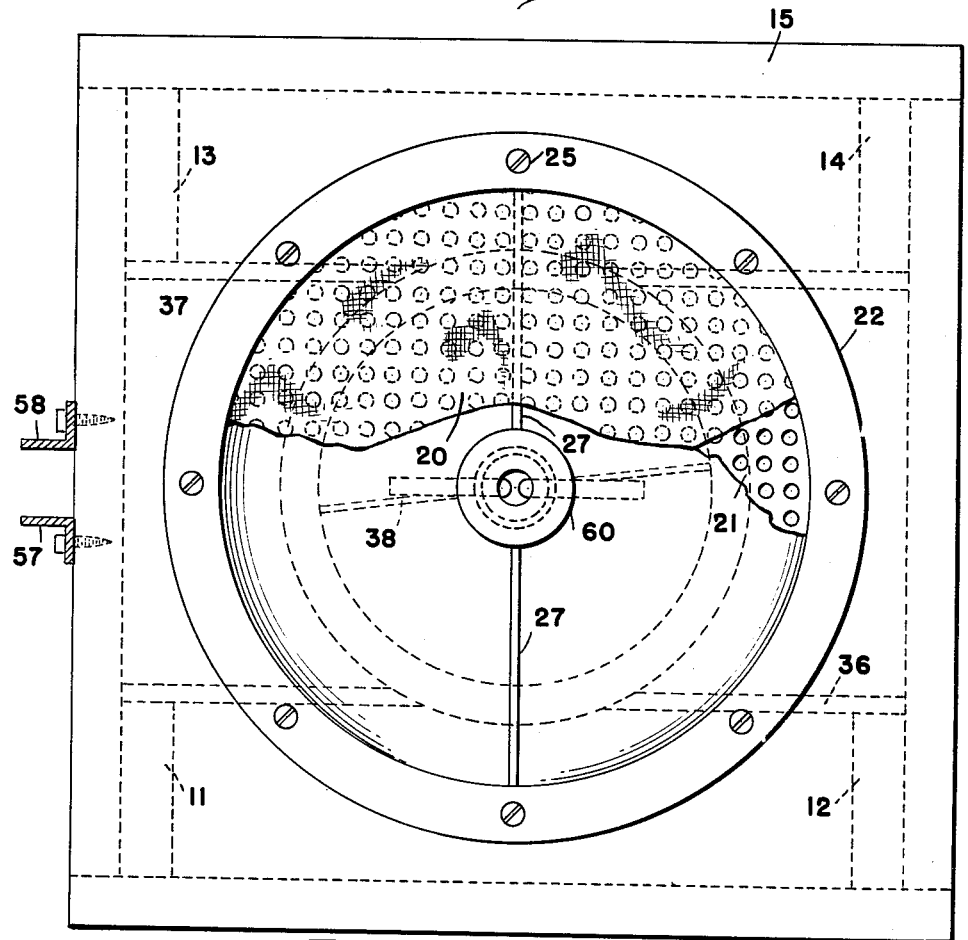
Fig. 7.
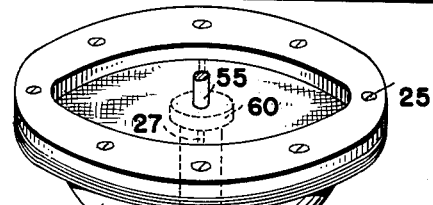
INVENTOR
J. CORDING JR.
A. SHAINES
BY 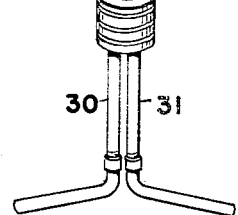
ATTORNEY Patented Apr. 28, 1953

UNITED STATES PATENT OFFICE 2,636,612

FILTER

James Cording, Jr., Philadelphia, Pa., and Alfred Shaines, Arlington, Mass., assignors to the United States of America as represented by the Secretary of Agriculture Application June 4, 1952, Serial No. 291,820

4 Claims. (Cl. 210—202.5)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to a filter of the type having a flat horizontal filter screen onto which slurry is continuously fed at a small area to one side of the axis of rotation of the screen and the slurry and filter cake are carried on the screen substantially a complete revolution of the screen, the filter cake being then continuously removed. A wash-liquid distributor is also provided for continuously spraying a wash liquid, such as water, onto the filter cake as it is carried on the screen. The wash-liquid distributor is so located that the slurry travels for a fractional distance of a revolution while filtrate drains therefrom before the filter cake is washed. The filter cake then travels a further fractional distance of the revolution while the wash liquor drains therefrom.

In general according to the present invention, such a filter is provided with a first and a second funnel both of which are located below and are rotatable with the screen. Each funnel catches filtrate as it drains from the slurry above it during travel of the slurry prior to washing. Then each catches wash liquor as it drains from the filter cake after spraying of the wash liquor thereon.

First and second stationary compartments are also provided. The drain from each funnel is displaced laterally from the axis of rotation of the filter screen and funnels, the stationary compartments being located therebelow and out of contact with the drains and so positioned relative to the drains that as they rotate, filtrate is continuously deposited by gravity flow into the first compartment and wash liquor into the second. This arrangement avoids use of valves for controlling flow of the filtrate and wash liquor into their respective compartments, thus making for simplicity of construction and ease of cleaning.

Other objects will be apparent from a consideration of the following description and claims.

For a detailed description of the invention, reference is made to the accompanying drawing in which:

Figure 1 illustrates a side view of the filter with parts broken away for illustration purposes;

Figure 2 is a vertical section of a portion of the filter, the scale being enlarged over that of Figure 1;

Figure 3 is a view on line 3—3 of Figure 2, with parts broken away;

Figure 4 is a section on line 4—4 of Figure 3;

Figure 5 is a view corresponding to Figure 3 but on a reduced scale, and showing more detail;

Figure 6 is a view on line 6—6 of Figure 1, but on an enlarged scale thereover; and Figure 7 is a three-dimensional view of a detail assembly of the filter screen and attached funnels.

The filter is provided with a supporting frame having legs 11, 12, 13 and 14 braced at the bottom as shown and having a flat top 15.

The filter screen is provided by a filter cloth 20 supported on a perforated metal plate 21, the edge of the screen being hermetically sealed as by a clamp ring 22, gaskets 23 and 24 and clamp bolts 25, to the bowl 26. A vertical baffle 27 divides the bowl into first and second funnels 28 and 29 having drains in the form of tubes 30 and 31 respectively, leading from the funnels. The bowl has a downwardly extending pipe 32 fixed thereto through which the tubes 30 and 31 extend.

An upright container 35 is supported on the frame by cross members 36 and 37 attached to the legs. The container is provided with a vertical baffle 38 dividing it into two compartments 39 and 40. A cover 41 is hermetically sealed to the container as by a gasket 42 and clamp bolts 43. The cover is provided at its top with an opening as by an upright pipe 44 the lower end of pipe 32 making rotatable sealing communication therewith as by a rotatable hermetically sealed joint 45, which also supports the weight of the bowl 26 and its carried parts. Thus the drains from the funnels or tubes 30 and 31 are displaced laterally from the axis of rotation of the screen and funnels and are above and out of contact with the compartments 39 and 40. Pipe 44 extends upwardly through an aperture in top 15 and is rigidly supported thereon as shown.

The bowl 26 and filter screen are rotated by means of a power device such as a driven belt pulley or motor, as schematically represented at 50, driving a worm 51 which in turn drives a worm wheel 52 through which a drive shaft 53 extends and is non-rotatably attached to the worm wheel 52 by a set screw 54. Shaft 53 makes easily detached driving engagement with a stub shaft 55 as by a splined joint 56. The various elements above described for rotating the bowl are supported on a bracket formed of two upright posts 57 and 58 suitably attached to the frame. Stub shaft 55 extends downwardly through a central aperture in the filter screen and is rigidly coupled to the bowl by means of pin 59 and cap 60 which is attached to the upper end of pipe 32.

A slurry distributor such as a pipe 65 with an outlet opening and controlled with a valve 66 provides means for continuously depositing slurry on a small area of the screen to one side of its axis of rotation. Means in the form of a scraper 69 having an inclined forward surface, as best illustrated in Figures 2, 3 and 4, continuously removes filter cake from the filter screen and elevates it over the clamp ring 22, from whence it falls by gravity into a suitable container (not shown).

Scraper 69 is provided with an aperture near one end which is loosely fitted over stub shaft 55, the outer end of the scraper being stopped from rotating by engaging a stop 70.

The scraper for removing the filter cake is so positioned adjacent to the slurry distributor that the filter screen carries the slurry and resulting filter cake substantially a complete revolution before the cake is removed. A wash-liquid distributor, such as a water supply pipe 75 with suitable spray apertures and controlled with a valve 76, is provided to continuously spray the wash water on the filter cake as it is carried on the screen, the wash-liquid distributor being so located, preferably about a mid-revolution between the slurry distributor and the scraper, that the slurry travels a corresponding distance of the revolution while filtrate drains therefrom and then travels the corresponding fractional distance while the wash liquor drains therefrom. Thus as the filter screen and bowl are rotated each of the funnels 28 and 29, which are located below the filter screen, will catch filtrate as it drains from the slurry above it during travel of the slurry prior to the washing. Thereafter the same funnel will catch wash liquor as it drains from the filter cake after spraying of the wash liquid on the cake. The compartments 39 and 40 are so positioned relative to the drains from the funnels that as the bowl and drains rotate the filtrate and wash water are continuously deposited by gravity flow in the first and second compartments, respectively, from which they may be removed by suitable pumps from outlets 79 and 80.

Means such as a nipple 85 is provided to connect the compartments to a vacuum line to obtain reduced pressure, as measured by a suitable gage 86, in the funnels. This enhances withdrawal of the filtrate from the slurry and wash liquor from the filter cake.

To remove the filter screen for replacement and for access to the bowl for cleaning purposes, set screw 54 is loosened, whereupon shaft 53 may be raised by means of handle 90 provided for the purpose. With pipes 65 and 75 out of the way, clamp bolts 25 are removed, whereupon clamp ring 22, gasket 23, filter cloth 20 and perforated plate 21 are easily lifted from and over the stub shaft 55.

We claim:

1. A filter comprising a flat horizontal rotatable filter screen, a slurry distributor for continuously depositing slurry on the screen at a small area to one side of the axis of rotation of the screen, means for continuously removing filter cake from the screen after it has been carried substantially a complete revolution on the screen, a wash-liquid distributor for continuously spraying wash liquid on the filter cake as it is carried on the screen, said wash-liquid distributor being so located that the slurry travels for a fractional distance of the revolution while filtrate drains therefrom before the filter cake is washed and then travels a further fractional distance of the revolution while wash liquor drains therefrom before the filter cake is removed, a first funnel and a second funnel both of which are located below and are rotatable with the screen, each funnel catching the filtrate as it drains from the slurry above it during travel of the slurry prior to washing and then catching wash liquor as it drains from the filter cake after spraying of the wash liquid thereon, the drain from each funnel being displaced laterally from the axis of rotation of the filter screen and funnels, and a stationary first compartment and second compartment located below and out of contact with the drains from the funnels and so positioned relative to them that as the drains rotate the filtrate is continuously deposited by gravity flow in the first compartment and wash liquor is continuously deposited by gravity flow in the second compartment.

2. A filter according to claim 1 characterized in that the two funnels comprise an upright bowl having a dividing baffle.

3. A filter according to claim 2 characterized in that the two compartments comprise an upright container having a dividing baffle.

4. A filter according to claim 3 characterized in that the edge of the filter screen is hermetically sealed to the bowl, the bowl is provided at its bottom with a downwardly extending pipe fixed thereto, the drain from the funnels are tubes extending downwardly through the pipe, the container comprising the two compartments is provided with a cover hermetically sealed thereto and provided at its top with an opening with which the lower end of the pipe makes rotatable, sealing communication, and means is provided for connecting the compartments to a vacuum line, whereby reduced pressure is obtainable in the funnels to enhance withdrawal of the filtrate from the slurry and withdrawal of the wash liquor from the filter cake.

JAMES CORDING, JR.
ALFRED SHAINES.

References Cited in the file of this patent

UNITED STATES PATENTS

| Number | Name | Date |
|---|---|---|
| 701,687 | Desaulles | June 3, 1902 |

FOREIGN PATENTS

| Number | Country | Date |
|---|---|---|
| 2,815 | Great Britain | of 1908 |
| 484,963 | Germany | of 1929 |